May 18, 1943     T. M. LINVILLE     2,319,614

DYNAMO-ELECTRIC MACHINE

Filed June 23, 1942

Inventor:
Thomas M. Linville,
by Harry E. Dunham
His Attorney.

Patented May 18, 1943

2,319,614

UNITED STATES PATENT OFFICE 2,319,614

DYNAMOELECTRIC MACHINE

Thomas M. Linville, Schenectady, N. Y., assignor to General Electric Company, a corporation of New York Application June 23, 1942, Serial No. 448,058

7 Claims. (Cl. 171—223)

My invention relates to dynamo-electric machines and more particularly to an improved excitation system for such machines adapted to provide a half turn series excitation to the main pole pieces of the machine without mounting a series field exciting winding on the main pole pieces.

Certain types of dynamo-electric machines are provided with series field excitation in addition to a separate or self-excited source of excitation for the main pole pieces of the machines. Under certain conditions, it is desirable that the series excitation of the main pole pieces should include substantially only a half turn per pole.

An object of my invention is to provide an improved dynamo-electric machine wherein the main pole pieces are provided with a simplified arrangement for supplying a half turn series excitation to each of the main pole pieces.

Another object of my invention is to provide an improved excitation member for a dynamo-electric machine wherein a half turn series excitation is provided to the main pole pieces without the use of series field exciting windings mounted on the main pole pieces.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
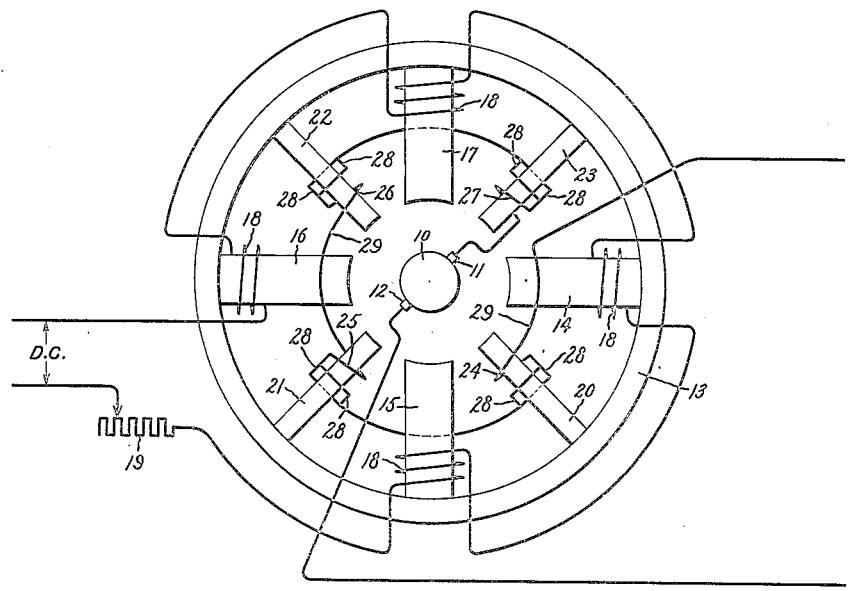
Figure 2:
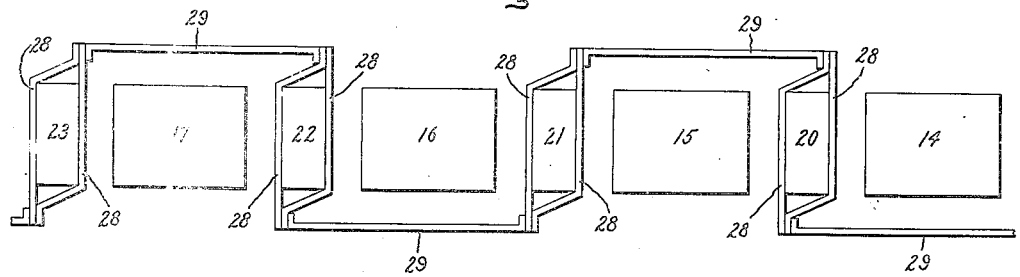

In the drawing, Fig. 1 is a schematic side elevational view of a dynamo-electric machine provided with an embodiment of my improved and simplified field excitation system, and Fig. 2 is an expanded schematic diagram illustrating the arrangement and connection of a series winding on the pole pieces of a dynamo-electric machine such as that shown in Fig. 1.

Referring to the drawing, I have shown an embodiment of my invention applied to a direct current electric generator provided with a rotatable member or armature 10 having a suitable winding connected to a commutator and provided with electric contact brushes 11 and 12. The excitation of this machine is provided by a stationary member including a main magnet frame 13 provided with main pole pieces, 14, 15, 16, and 17 about which main field exciting windings 18 are arranged. These field exciting windings 18 are adapted to be connected to a separate source of electrical power supply and the energization thereof may be varied by any suitable means, such as a variable resistor 19 connected in series therewith. In order to improve the commutation characteristics of the machine, commutating pole pieces 20, 21, 22, and 23 are arranged intermediate the main pole pieces of the machine and are arranged to be excited by commutating field exciting windings 24, 25, 26, and 27, respectively. A half turn of series excitation is provided to this machine without the arrangement of series field exciting windings on the main pole pieces by providing series field exciting windings which are mounted on the commutating pole pieces of the machine. These series field exciting windings comprise electrical conductors 28 which are divided substantially equally in half on each side of each of the commutating pole pieces for carrying current in the same direction on both axial sides of the commutating pole pieces and also for carrying substantially equal currents on each of the transverse sides of the commutating pole pieces, thereby providing substantially no net excitation to the commutating pole pieces. The series field exciting winding conductors on adjacent commutating pole pieces are connected together by electrical conductors 29 arranged to extend across only one transverse or circumferential side of each of the main pole pieces, thereby being adapted to carry full series current across only one transverse side of each of the main pole pieces. The commutating field exciting windings and the series field exciting windings are connected in series with one of the commutator brushes and are adapted to carry full load current. Thus, when the machine is in operation, the series field exciting windings on the commutating pole pieces and their interconnections carry full series load current and provide substantially no net excitation to the commutating pole pieces while providing substantially half series current excitation to each axial side of the main pole pieces and full series current excitation across only one transverse side of each of the main pole pieces, thereby providing for a half turn series excitation to each of the main pole pieces. This arrangement provides a very simple construction and, as shown in Fig. 2, is very efficient in the utilization of the copper for supplying the series excitation, as substantially all of the conductor material is utilized as active conductors for supplying the series excitation to the machine.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An excitation member for a dynamo-electric machine including main pole pieces and commutating pole pieces arranged intermediate said main pole pieces, means including a series field exciting winding having substantially equally divided conductors arranged on each side of said commutating pole pieces for carrying current in the same direction on both sides of said commutating pole pieces and for providing substantially half series current excitation to each axial side of said main pole pieces and substantially no excitation to said commutating pole pieces, and means for connecting in series said series field exciting winding conductors on adjacent commutating pole pieces arranged across only one transverse side of each of said main pole pieces providing for substantially a half turn series excitation to said main pole pieces.

2. A stationary member for a dynamo-electric machine including main pole pieces and commutating pole pieces arranged intermediate said main pole pieces, a main field exciting winding on said main pole pieces, means including a series field exciting winding having substantially equalliy divided conductors arranged on each side of said commutating pole pieces for carrying current in the same direction on both sides of said commutating pole pieces and for providing substantially half series current excitation to each axial side of said main pole pieces and substantially no excitation to said commutating pole pieces, and means for connecting in series said series fluid exciting winding conductors on adjacent commutating pole pieces arranged across only one transverse side of each of said main pole pieces providing for substantially a half turn series excitation to said main pole pieces.

3. A dynamo-electric machine including a rotatable member and a stationary member, said stationary member including main pole pieces and commutating pole pieces arranged intermediate said main pole pieces, means including a series field exciting winding having substantially equally divided conductors arranged on each side of said commutating pole pieces for carrying current in the same direction on both sides of said commutating pole pieces and for providing substantially half series current excitation to each axial side of said main pole pieces and substantially no excitation to said commutating pole pieces, and means for connecting in series said series field exciting winding conductors on adjacent commutating pole pieces arranged across only one transverse side of each of said main pole pieces providing for substantially a half turn series excitation to said main pole pieces.

4. A dynamo-electric machine including a rotatable member and a stationary member, said stationary member including main pole pieces and commutating pole pieces arranged intermediate said main pole pieces, a main field exciting winding on said main pole pieces, means including a series field exciting winding having substantially equally divided conductors arranged on each side of each of said commutating pole pieces for carrying current in the same direction on both sides of said commutating pole pieces and for providing substantially half series current excitation to each axial side of said main pole pieces, and means for connecting in series said series field exciting winding conductors on adjacent commutating pole pieces arranged across only one transverse side of each of said main pole pieces providing for substantially a half turn series excitation to said main pole pieces.

5. A dynamo-electric machine including a rotatable member and a stationary member, said stationary member including main pole pieces and commutating pole pieces arranged intermediate said main pole pieces, a main field exciting winding on said main pole pieces, means including a series field exciting winding having substantially equally divided conductors arranged on each side of said commutating pole pieces for carrying current in the same direction on both sides of said commutating pole pieces and for providing substantially half series current excitation to each axial side of said main pole pieces and substantially no excitation to said commutating pole pieces, means for connecting in series said series field exciting winding conductors on adjacent commutating pole pieces arranged across only one transverse side of each of said main pole pieces providing for substantially a half turn series excitation to said main pole pieces.

6. A dynamo-electric machine including a rotatable member and a stationary member, said stationary member including main pole pieces and commutating pole pieces arranged intermediate said main pole pieces, a main field exciting winding on said main pole pieces, a commutating field exciting winding on said commutating pole pieces, means including a series field exciting winding having substantially equally divided conductors arranged on each side of each of said commutating pole pieces for carrying current in the same direction on both sides of said commutating pole pieces and for providing substantially half series current excitation to each axial side of said main pole pieces, and means for connecting in series said series field exciting winding conductors on adjacent commutating pole pieces arranged to provide substantially full series current excitation across only one transverse side of each of said main pole pieces providing for substantially a half turn series excitation to said main pole pieces.

7. A dynamo-electric machine including a rotatable member and a stationary member, said stationary member including main pole pieces and commutating pole pieces arranged intermediate said main pole pieces, a main field exciting winding on said main pole pieces, a commutating field exciting winding on said commutating pole pieces, means including a series field exciting winding having substantially equally divided conductors arranged on each side of each of said commutating pole pieces for carrying current in the same direction on both sides of said commutating pole pieces and for providing substantially half series current excitation to each axial side of said main pole pieces, means for connecting in series said series field exciting winding conductors on adjacent commutating pole pieces arranged to provide substantially full series current excitation across only one transverse side of each of said main pole pieces providing for substantially a half turn series excitation to said main pole pieces, and means for connecting said commutating field exciting winding in series with said series field exciting windings.

THOMAS M. LINVILLE.